United States Patent
Omura

(10) Patent No.: US 12,540,247 B2
(45) Date of Patent: Feb. 3, 2026

(54) PRIMER COMPOSITION

(71) Applicant: THREEBOND CO., LTD., Hachioji (JP)

(72) Inventor: Ai Omura, Hachioji (JP)

(73) Assignee: THREEBOND CO., LTD., Hachioji (JP)

( * ) Notice: Subject to any disclaimer, the term of this patent is extended or adjusted under 35 U.S.C. 154(b) by 571 days.

(21) Appl. No.: 17/776,026

(22) PCT Filed: Oct. 29, 2020

(86) PCT No.: PCT/JP2020/040570
§ 371 (c)(1),
(2) Date: May 11, 2022

(87) PCT Pub. No.: WO2021/106485
PCT Pub. Date: Jun. 3, 2021

(65) Prior Publication Data
US 2022/0411642 A1    Dec. 29, 2022

(30) Foreign Application Priority Data
Nov. 27, 2019    (JP) .................................. 2019-213783

(51) Int. Cl.
C09D 5/00    (2006.01)
(52) U.S. Cl.
CPC .................... C09D 5/002 (2013.01)
(58) Field of Classification Search
CPC .... C08K 2201/014; C08K 5/07; C08K 5/092; C08K 5/105; C08K 5/132; C08K 5/18; C09D 5/002; C09D 7/20; C09D 7/63; C09D 201/00; C09J 2301/408; C09J 2301/416; C09J 2423/008; C09J 5/02; C09J 201/00
See application file for complete search history.

(56) References Cited

U.S. PATENT DOCUMENTS

| 3,892,885 A | 7/1975 | Bragole |
| 2005/0147919 A1 | 7/2005 | Kunz et al. |
| 2006/0257575 A1 | 11/2006 | Macor et al. |
| 2012/0171434 A1 | 7/2012 | Herlihy |
| 2019/0002695 A1 | 1/2019 | Pibre et al. |
| 2019/0003032 A1 | 1/2019 | Fuke et al. |
| 2020/0308460 A1 | 10/2020 | Soga |
| 2021/0147684 A1 | 5/2021 | Pibre et al. |

FOREIGN PATENT DOCUMENTS

| CN | 1622862 A | | 6/2005 | |
| CN | 109251389 A | * | 1/2019 | ............ C08J 3/245 |
| JP | S62170018 A | | 7/1987 | |
| JP | S62205525 A | | 9/1987 | |
| JP | H06-136163 A | | 5/1994 | |
| JP | H06-336575 A | | 12/1994 | |
| JP | H07-18203 A | | 1/1995 | |
| JP | H11-59005 A | | 3/1999 | |
| JP | 2007-501110 A | | 1/2007 | |
| JP | 3884094 B2 | * | 2/2007 | ............ C08G 59/68 |
| JP | 2009-149735 A | | 7/2009 | |
| JP | 2012-116173 A | | 6/2012 | |
| JP | 2013-503929 A | | 2/2013 | |
| JP | 2019-507205 A | | 3/2019 | |
| KR | 20090011456 A | * | 2/2009 | ............... C08F 2/48 |
| WO | 2014/118382 A1 | | 8/2014 | |
| WO | 2019/069915 A1 | | 4/2019 | |

OTHER PUBLICATIONS

China National Intellectual Property Administration, "Office Action with Search Report for Chinese Patent Application 202080081888. X," Jan. 10, 2023.
European Patent Office, "Extended European Search Report with Search Opinion for European Patent Application 20892875.4," Nov. 8, 2023.
China National Intellectual Property Administration, "Office Action with Search Report for Chinese Patent Application 202080081888. X," Jul. 22, 2023.
PCT/ISA/210, "International Search Report for PCT International Application No. PCT/JP2020/040570," Dec. 28, 2020.
Notice of Reasons for Refusal for Japanese Application No. 2021-561241 mailed on Dec. 2. 2024; 9 pp.

* cited by examiner

Primary Examiner — Shuangyi Abu Ali
(74) Attorney, Agent, or Firm — HAUPTMAN HAM, LLP

(57) ABSTRACT

The present invention relates to a primer composition that achieves excellent adhesion to poorly adhesive materials. Specifically, the present invention relates to a primer composition that includes (A) benzophenone, (B) a compound that has at least 2 benzene rings and a molecular weight of at least 190, and (C) a solvent.

13 Claims, No Drawings

PRIMER COMPOSITION

RELATED APPLICATIONS

The present application is National Phase of International Application No. PCT/JP2020/040570 filed Oct. 29, 2020, and claims priority from Japanese Application No. 2019-213783, filed Nov. 27, 2019, the disclosure of which is hereby incorporated by reference herein in its entirety.

TECHNICAL FIELD

The present invention relates to a primer composition that improves adhesiveness to a hard-to-bond material.

BACKGROUND ART

Hard-to-bond materials (polyethylene, polypropylene, and the like) are chemically stable and have low surface polarities, and it is thus difficult to use adhesives for them. However, in recent years, the use of hard-to-bond materials has been increasing from the viewpoint of reduction in weight and freedom of design for various parts. Conventional approaches to bonding for hard-to-bond materials include surface modifications (primer treatment, plasma treatment, corona treatment, ultraviolet treatment, ozone treatment, and flame treatment), and among these, the primer treatment is a very useful technique because the primer treatment does not require dedicate facilities. It has conventionally been known that surface modification can be conducted using a hydrogen abstraction-type initiator as a primer treatment agent (Patent Literature 1).

CITATION LIST

Patent Literatures

Patent Literature 1: Japanese Patent Application Publication No. Hei 6-336575

SUMMARY OF INVENTION

However, it has been found that regarding the conventional primer compositions using hydrogen abstraction-type initiators, if it takes time before an adherend is irradiated with an active energy ray after the primer composition is applied to the adherend, the effect to improve the adhesive force is gradually lost, and accordingly the duration of the effect of the primer is short. The duration of the effect mentioned in the present invention means a time during which the effect to improve the adhesive force as the primer composition is maintained. In addition, regarding the conventional primers, it is necessary to use multiple types of primers depending on the adhesive and the sealant.

As a result of earnestly studying in order to solve the above problems, the present inventors have found an approach to obtaining a primer composition that is excellent in the duration of the effect until irradiation with an active energy ray after application of the primer, and further that can improve adhesive force regardless of the type of the form of cure of an adhesive or a sealant to be used as a curable resin composition.

The invention of the present application may be any of the following [1] to [10]. What are obtained by combining specific elements described in [1] to [10] as appropriate are also encompassed within the range of the invention of the present application.

[1]
A primer composition comprising:
a component (A): benzophenone;
a component (B): a compound having two or more benzene rings and having a molecular weight of 190 or more; and
a component (C): a solvent.

[2]
The primer composition according to the above [1], wherein the component (B) is a compound having a structure represented by the following general formula (1):

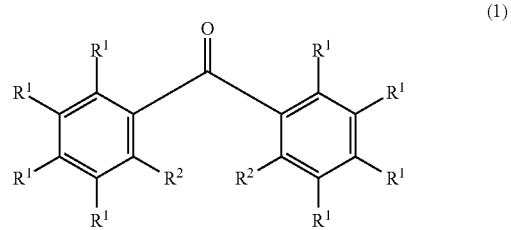

wherein $R^1$ and $R^2$ are each independently a substituent selected from the group consisting of a hydrogen atom, a halogen, a substituted or unsubstituted alkyl group, a substituted or unsubstituted carboxyl group, a hydroxyl group, a nitrogen atom, and a sulfur atom, and $R^2$ may be directly bound to the other $R^2$ or may be indirectly bound to the other $R^2$ via a carbon atom, an oxygen atom, a sulfur atom, or a nitrogen atom.

[3]
The primer composition according to the above [1] or [2], wherein a content of the component (B) is 0.1 to 20 parts by mass relative to 100 parts by mass of the component (A).

[4]
The primer composition according to any one of the above [1] to [3], wherein the component (C) is acetone or n-hexane.

[5]
The primer composition according to any one of the above [1] to [4], that is used for bonding a hard-to-bond material.

[6]
A method for bonding an adherend, comprising the steps of:
(1): applying the primer composition according to any one of the above [1] to [5] to a surface of an adherend;
(2): drying the applied primer composition;
(3): modifying the surface of the adherend onto which the primer composition is applied by irradiating the dried primer composition with an active energy ray; (4): applying a curable resin composition onto the modified surface of the adherend; and
(5): forming a cured product of the curable resin composition on the surface of the adherend by curing the applied curable resin composition.

[7]
The bonding method according to the above [6], wherein the curable resin composition comprises a compound having any of a (meth)acryloyl group, an epoxy group, and a hydrolyzable silyl group.

[8]
The bonding method according to the above [6] or [7], wherein
the adherend is of polypropylene or polyethylene.
[9]
A method for modifying a surface of an adherend, comprising the steps of:
(1): applying the primer composition according to any one of the above [1] to [5] onto a surface of an adherend;
(2): drying the applied primer composition; and
(3): modifying the surface of the adherend onto which the primer composition is applied by irradiating the dried primer composition with an active energy ray.
[10]
An adherend having an adherend surface modified by the modification method according to the above [9].

Since the primer composition of the present invention has a long duration of the effect after being applied to an adherend and can be used for any types of forms of cure of an adhesive and a sealant to be used as a curable resin composition, the primer composition of the present invention is very useful.

DESCRIPTION OF EMBODIMENTS

Next, the detail of the present invention will be described. Note that preferable aspects, more preferable aspects, and the like exemplified below can be combined with one another as appropriate and used regardless of the expressions of "preferable", "more preferable", and the like. In addition, the descriptions of ranges of numerical values are examples, and ranges obtained by combining as appropriate the upper limit and the lower limit of each range as well as numerical values of Examples can be favorably used regardless of the expressions of "preferable", "more preferable", and the like. Moreover, terms such as "contain" and "comprise" may be read as "consist essentially of" or "consist only of" as appropriate.

<Primer Composition>

One of aspects of the present invention is a primer composition comprising: a component (A): benzophenone; a component (B): a compound having two or more benzene rings and having a molecular weight of 190 or more; and a component (C): a solvent.

[Component (A)]

The component (A) used in the present invention is benzophenone. The component (A) has a significant effect to improve adhesiveness to a polyolefin such as polypropylene, which is a hard-to-bond material, by causing hydrogen abstraction reaction through a triplet excited state with an active energy ray such as an ultraviolet ray irradiation. The active energy ray mentioned in the present invention encompasses all the types of light in a broad sense, including radioactive rays such as an α-ray and a β-ray, electromagnetic waves such as a γ-ray and an X-ray, an electron beam (EB), ultraviolet rays having a wavelength of about 100 to 400 nm, and visible light beams having a wavelength of about 400 to 800 nm, and is preferably an ultraviolet ray. It is considered that when the component (A) of the present invention is irradiated with an active energy ray, hydrogen is abstracted from the surface of the adherend of a polyolefin or the like, and the adherend thus activated and the curable resin composition react with each other to improve adhesion at the interstice of the adherend, thus affecting the adhesiveness of the adherend. Note that the benzophenone of the component (A) is different from the component (B), which will be described later, and is a compound that has a molecular weight of 182.2 and in which both $R^1$ and $R^2$ are hydrogen in a formula (1) which represents the component (B).

[Component (B)]

The component (B) used in the present invention is a compound that has two or more, preferably two or three benzene rings, and has a molecular weight of 190 or more, 200 or more, or 210 or more. Containing the component (B) makes it possible to extend the duration of the effect after application of the primer. The molecular weight of the component (B) is preferably 190 or more and less than 1000, more preferably 190 or more and less than 500, particularly preferably 190 or more and less than 400, and most preferably 190 or more and less than 300, from the viewpoint of an improvement in adhesive force and the durability of the effect.

The component (B) is preferably a compound that has a structure represented by the following general formula (1), from the viewpoint of the compatibility with the component (A) when dissolved into the component (C) (solvent).

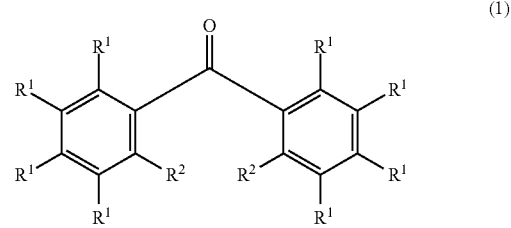

wherein $R^1$ and $R^2$ are each independently a substituent selected from the group consisting of a hydrogen atom, a halogen, a substituted or unsubstituted alkyl group, a substituted or unsubstituted carboxyl group, a hydroxyl group, a nitrogen atom, and a sulfur atom, and $R^2$ may be directly bound to the other $R^2$ or may be indirectly bound to the other $R^2$ via a carbon atom, an oxygen atom, a sulfur atom, or a nitrogen atom. Preferable $R^1$ and $R^2$ are each independently a substituent selected from the group consisting of a methyl group, an ethyl group, a methylamino group, an ethylamino group, a carboxyl group, a (meth)acryloyloxy group, and a hydroxyl group. It is also preferable that $R^2$ be indirectly bound to the other $R^2$ via an oxygen atom. Note that the component (A) and the component (B) are different, and there is no possibility that all $R^1$ and $R^2$ in the general formula (1) are hydrogen atoms at the same time.

Specific examples of the component (B) include 2-methylbenzophenone, 3-methylbenzophenone, 2-ethylbenzophenone, 3-ethylbenzophenone, 4-methylbenzophenone, 4-ethylbenzophenone, 4-bromobenzophenone, 4-chlorobenzophenone, 4,4'-dichlorobenzophenone, 4-chloro-4'-benzylbenzophenone, 4,4'-dimethoxybenzophenone, 3-methoxybenzophenone, 2,4,6-trimethylbenzophenone, 3,3'-dimethyl-4-methoxybenzophenone, 4-cyanobenzophenone, 4-methacryloyloxybenzophenone, 4-benzoylbenzoic acid, 2,2,4,4-tetramethylbenzophenone, 4,4-dimethylbenzophenonc, 4-dimethylaminobenzophenone, 2,4-dihydroxybenzophenone, 3,3,4,4-benzophenonetetracarboxylic dianhydride, 4-(dimethylamino)benzophenone, 2,4-dimethoxy-4'-hydroxybenzophenone, xanthone, 3-hydroxyxanthen-9-one, 9-hydroxyxanthene, thioxanthone, 2-isopropylthioxanthone, 2,4-diethylthioxanthen-9- one, sodium anthraquinone-2-sulfonate monohydrate, and the like. Among these, 4-methacryloyloxybenzophenone, 2,2,4,4-tetramethylbenzophenone, 3,3,4,4-benzophenonetetracarboxylic dihydride, 4,4-dimethylbenzophenone, 4-dimethylaminobenzophenone, xanthone, and 2,4-dihydroxybenzophenone are preferable from the viewpoint of the durability of the effect as to whether or not the effect to improve the adhesive force as the primer composition of the present invention can be maintained for a long period of time.

The content of the component (B) is preferably 0.1 to 20 parts by mass, preferably 0.5 to 15 parts by mass, and most preferably 1 to 12 parts by mass, relative to 100 parts by mass of the component (A). When the content of the component (B) is 0.1 to 20 parts by mass, the adhesive force of the curable resin composition is excellent when the primer composition is used, and also it is possible to suppress a decrease in the effect to improve the adhesive force due to the elapse of time after the application of the primer composition.

[Component (C)]

The component (C) used in the present invention is a solvent. The solvent is not particularly limited as long as the component (A) and the component (B) can be dissolved in the solvent, but is a solvent having a vapor pressure of preferably 5 mmHg or more and less than 400 mmHg, more preferably 50 mmHg or more and less than 350 mmHg, and most preferably 100 mmHg or more and less than 300 mmHg, 25° C., from the viewpoint of drying properties after the application of the primer composition. When the vapor pressure of the component (C) is 5 mmHg or more and less than 400 mmHg, the component (C) is excellent in wetting and spreading properties onto a surface and drying properties after the application, and accordingly the workability is favorable. Specific examples of the component (C) include acetone, methyl acetate, ethyl acetate, methyl ethyl ketone, methanol, ethanol, n-propyl alcohol, isopropyl alcohol, n-butyl alcohol, isobutyl alcohol, sec-butyl alcohol, tert-butyl alcohol, ethylene glycol monomethyl ether, ethylene glycol diethyl ether, ethylene glycol monoisopropyl ether, propylene glycol monomethyl ether, propylene glycol monoethyl ether, n-heptane, n-octane, isooctane, methylcyclohexane, ethylcyclohexane, n-hexane, toluene, xylene, and the like, but acetone, methanol, ethanol, n-propyl alcohol, isopropyl alcohol, and n-hexane are preferably, acetone, isopropyl alcohol, and n-hexane are more preferably, and acetone and n-hexane are most preferable, from the viewpoints of compatibility with the component (A) and the component (B) and not affecting an adherend.

The total content of the component (A) and the component (B) is preferably 1 to 20 parts by mass, more preferably 2 to 17 parts by mass, and most preferably 3 to 15 parts by mass, relative to 100 parts by mass of the component (C). When the total content is 1 to 20 parts by mass, it is possible to uniformly dissolve the component (A) and the component (B) into the component (C) and to thus obtain a primer composition excellent in drying properties after the application of the primer composition.

[Optional Component]

The primer composition of the present invention may contain an additive such as a filler, a colorant, a plasticizer, a coupling agent, a leveling agent, or a rheology controlling agent as long as the properties of the present invention are not impaired, but it is preferable that the primer composition do not contain any additives from the viewpoint of the wetting properties onto the surface of an adherend and the applicability to each curable composition.

Specifically, the filler includes organic powders, inorganic powders, metallic powders, and the like. Fillers of inorganic powders includes glass, alumina, mica, ceramic, a silicone rubber powder, calcium carbonate, aluminum nitride, a carbon powder, kaolin clay, dried clay mineral, dried diatomite, and the like. The amount of the inorganic powder to be blended is preferably about 0.1 to 100 parts by mass relative to 100 parts by mass of the total of the components (A) and (B). When the amount is 100 parts by mass or less, it is possible to obtain sufficient fluidity as the primer composition and to thus obtain favorable workability.

Fillers of organic powders include, for example, polyethylene, polypropylene, nylon, cross-linked acrylic, cross-linked polyethylene, polyester, polyvinyl alcohol, polyvinyl butyral, and polycarbonate. The amount of the organic powder to be blended is preferably about 0.1 to 100 parts by mass relative to 100 parts by mass of the total of the components (A) and (B). When the amount is more than 0.1 parts by mass, the effect does not decrease, while when the amount is 100 parts by mass or less, it is possible to obtain sufficient fluidity as the primer composition and to thus obtain favorable workability.

Fillers of metallic powders include, for example, gold, platinum, silver, copper, indium, palladium, nickel, alumina, tin, iron, aluminum, stainless steel, and the like. The amount of the metallic powder to be blended is preferably about 0.1 to 100 parts by mass, and more preferably 1 to 50 parts by mass, relative to 100 parts by mass of the total of the components (A) and (B).

It is appropriate that the amount of the optional component contained in the primer composition of the present invention is, for example, 0.05 to 100 parts by mass, preferably 0.1 to 50 parts by mass, and more preferably 0.2 to 20 parts by mass, relative to 100 parts by mass of the total of the components (A) and (B), for example.

[Primer]

The primer mentioned in the present invention is also called an undercoat, is a base material applied at the stage before various members (adherends) are bonded or sealed using a curable resin composition, and has effects to enhance the adhesiveness and the adhesion between the surface of the adherend and painting surface to be painted thereafter, and in the present invention, to improve the adhesive force of the curable resin composition. The primer composition mentioned in the present invention means a composition that has characteristics of enabling an improvement in the adhesive force, and the like by being placed between an adherend and the curable resin composition, in order to assist adhesion of an adherend, particularly a member that is hard to bond (hard-to-bond material), by the curable resin composition. The primer composition itself also has an adhesive force, and can adhere to particularly a member that is hard to bond (hard-to-bond material), and thereafter by curing a curable resin composition on the surface of the adherend modified by the primer composition, it is possible to improve the adhesiveness between the cured product of the curable resin composition and the adherend.

<Adherend>

The adherend means a member to be bonded and/or sealed by a curable resin composition using the primer composition of the present invention. The adherend for which the primer composition of the present invention is used is not particularly limited, but is preferably a hard-to-bond material. Specific examples of the hard-to-bond materials mentioned in the present invention include polypropylene, polyethylene, polyacetal, polyethylene terephthalate, syndiotactic polystyrene, polyethylene naphthalate, polybutylene terephthalate, polyphenylene ether, polyphenylene sulfide, ethylene propylene diene rubber, liquid crystal polymer, cyclo olefin polymer, polycarbonate, 6,6-nylon, polyamide, polyvinyl chloride, silicone resin, and the like. Multiple adherends can be used, and in the case where one of the adherends is a hard-to-bond material, the other may be a material that is not a hard-to-bond material, such as an acrylic resin, glass, wood, and a metal.

The primer composition of the present invention exhibits the effects as a primer when a curable resin composition such as an adhesive or a sealant is used.

<Curable Resin Composition>

The curable resin composition used in the present invention means a composition that can be cured by a cause such as moisture, heat, or active energy to bond and/or seal an adherend. The form of cure of the curable resin composition is not particularly limited, but the curable resin composition can be used in various forms of cure such as moisture curability, anaerobic curability, heat curability, and active energy ray curability, for example. Among these, heat curability or active energy ray curability is preferable from the viewpoint that they are excellent in adhesion durability.

The curable resin composition comprises a compound having one or more of various functional groups depending on the form of cure. Examples of the functional groups include a (meth)acryloyl group, an allyl group, a hydrosilyl group, a glycidyl group, an epoxy group, a hydrolyzable silyl group, a silanol group, a mercapto group, an amino group, an isocyanate group, a hydroxy group, a cyanate group, an acid anhydride group, a phenol group, an isocyanurate group, and the like. Among these, the curable resin composition preferably comprises a compound having two or more of the functional groups, and preferably comprises a compound having functional groups such as a (meth)acryloyl group, an allyl group, a glycidyl group, an epoxy group, a hydrolyzable silyl group, and/or an isocyanate group, from the viewpoint that such a curable resin composition is excellent in adhesiveness.

The hydrolyzable silyl group includes, for example, alkoxy groups such as a methoxy group, an ethoxy group, a propoxy group, a butoxy group, a methoxyethoxy group, and an ethoxyethoxy group; acyloxy groups such as an acetoxy group, a propionyloxy group, a butylcarbonyloxy group, and a benzoyloxy group; alkenyloxy groups such as an isopropenyloxy group, an isobutenyloxy group, and a 1-ethyl-2-methylvinyloxy group; ketoxime groups such as a dimethylketoxime group, a methylethylketoxime group, a diethylketoxime group, a cyclopentanoxime group, and a cyclohexanoxime group; amino groups such as a N-methylamino group, a N-ethylamino group, a N-propylamino group, a N-butylamino group, a N,N-dimethylamino group, a N,N-diethylamino group, and a N-cyclohexylamino group; amide groups such as a N-methylacetoamide group, a N-ethylacetoamide group, and a N-methylbenzamide group; aminooxy groups such as a N,N-dimethylaminooxy group and a N,N-diethylaminooxy group, and the like Specific examples of the heat-curable resin composition and the active energy ray-curable resin composition include, for example, heat- or active energy ray-curable resin compositions including curable vinyl polymers, curable polyether, curable polyester, curable polyurethane, curable polyurea, curable fluoropolymer, curable polyorganosiloxane, and curable epoxy.

The curable resin composition includes compositions that can be utilized as various adhesives. For example, the heat-curing adhesive containing a curable vinyl polymer includes, for example, compositions containing an acrylic polymer having an allyl group, polybutadiene, hydrogenated polybutadiene, polyisoprene, hydrogenated polyisoprene, polyisobutylene, a hydrosilyl compound, a hydrosilylation catalyst; compositions containing an acrylic polymer having a (meth)acryloyl group, polybutadiene, hydrogenated polybutadiene, polyisoprene, hydrogenated polyisoprene, polyisobutylene, and a thermal radical initiator; compositions containing an acrylic polymer having a glycidyl group, polybutadiene, hydrogenated polybutadiene, polyisoprene, hydrogenated polyisoprene, polyisobutylene, and a thermal cationic initiator, and the like. In addition, the active energy ray-curing adhesive containing the curable vinyl polymer includes, for example, active energy ray-curable adhesives containing an acrylic polymer having a (meth)acryloyl group, polybutadiene, hydrogenated polybutadiene, polyisoprene, hydrogenated polyisoprene, polyisobutylene, and a photo radical initiator; active energy ray-curable adhesives containing polyisobutylene polymer or a polyacryl having a glycidyl group, and a photo cationic initiator; compositions containing an acrylic polymer having a glycidyl group, polybutadiene, hydrogenated polybutadiene, polyisoprene, hydrogenated polyisoprene, polyisobutylene, and a photo cationic initiator, and the like. In addition, the heat-curing adhesive containing the curable polyorganosiloxane includes, for example, a composition containing a polyorganosiloxane having an allyl group, a hydrosilyl compound, and a hydrosilylation catalyst; compositions containing a polyorganosiloxane having a (meth)acryloyl group, and a thermal radical initiator; compositions containing a polyorganosiloxane having a glycidyl group, and a thermal cationic initiator, and the like. In addition, the active energy ray-curing adhesive containing the curable polyorganosiloxane includes, for example, a composition containing a polyorganosiloxane having an allyl group, a hydrosilyl compound, and a photoactive hydrosilylation catalyst; compositions containing a polyorganosiloxane having a (meth)acryloyl group, and a photo radical initiator; compositions containing a polyorganosiloxane having a glycidyl group, and a photo cationic initiator, and the like. In addition, the heat-curing adhesive containing the curable epoxy includes bisphenol epoxy resins such as bisphenol A epoxy resin, bisphenol F epoxy resin, bisphenol S epoxy resin, bisphenol AS epoxy resin, bisphenol AD epoxy resin, and tetrabromobisphenol A epoxy resin; hydrogenated bisphenol type epoxy resins obtained by hydrogenating these bisphenol epoxy resins; oxazolidone epoxy resins obtained by reacting bisphenol A epoxy resin and bifunctional isocyanate; alkylene glycol epoxy resins such as ethylene glycol diglycidyl ether, propylene glycol diglycidyl ether, 1,2-butanediol diglycidyl ether, 1,3-butanediol diglycidyl ether, 1,4-butanediol diglycidyl ether, 2,3-butanediol diglycidyl ether, 1,5-pentanediol diglycidyl ether, 1,6-hexanediol diglycidyl ether, neopentyl glycol diglycidyl ether, and 1,4-cyclohexanedimethanol diglycidyl ether, alkylene oxide diol epoxy resins such as diethylene glycol diglycidyl ether, dipropylene glycol diglycidyl ether, triethylene glycol diglycidyl ether, tripropylene glycol diglycidyl ether, polyethylene glycol diglycidyl ether, and polypropylene glycol diglycidyl ether; novolac epoxy resins such as resorcin diglycidyl ether, hydroquinone diglycidyl ether, 4,4'-dihydroxy-3,3',5,5'-tetramethyl biphenyl diglycidyl ether, diglycidyl ether of 1,6-dihydroxy naphthalene, diglycidyl ether of 9,9-bis(4-hydroxyphenyl)fluorene, diglycidyl aniline, biphenyl epoxy resins, naphthalene epoxy resins, phenol novolac epoxy resins, cresol novolac epoxy resins, and naphthol novolac epoxy resins; glycidyl ethers such as triglycidyl ether of tris(p-hydroxyphenyl)methane, tetraglycidyl ether of tetrakis(p-hydroxyphenyl)ethane, triglycidyl isocyanurate, triglycidyl ether of glycerin, and tetraglycidyl ether of pentaerythritol; compositions containing glycidyl amine compounds such as tetraglycidyl diamino diphenyl methane, tetraglycidyl-m-xylylenediamine, triglycidyl-m-aminophenol, and triglycidyl-p-aminophenol, and the like.

The curable resin composition may contain a cross-linking agent, a catalyst, a curing agent, a colorant, a filler, a flame retardant, a diluent, a plasticizer, an antioxidant, an antifoam, a coupling agent, a leveling agent, a rheology controlling agent, and the like as long as the properties of the present invention are not impaired.

Here, the curing agent includes, for example, aliphatic polyamine curing agents such as triethylenetetramine, N-aminoethylpiperazine, and xylenediamine; aromatic amine curing agents such as meta-phenylenediamine and diamino diphenyl methane; secondary or tertiary amine curing agents such as piperidine, N,N-dimethylpiperazine, and triethylenediamine; imidazole curing agents such as 2-methylimidazole and 2-ethyl-4-methylimidazole, and the like. As the amount of the curing agent, a normally used amount can be employed, but it is appropriate that the amount of the curing agent to be used is 1 to 50 parts by mass, preferably 5 to 30 parts by mass, and more preferably 10 to 20 parts by mass, relative to 100 parts by mass of the curable resin composition such as bisphenol A epoxy resin, for example.

<Usage>

The primer composition of the present invention can contribute to modification of the surface of an adherend and bonding between a curable resin composition (or a cured product thereof) and the adherend through the following stages. Specifically, the primer composition of the present invention can be used for a method for modifying a surface of an adherend comprising the following steps (1) to (3), and a method for bonding an adherend comprising the following steps (1) to (5).

(1): A step of applying the primer composition of the present invention onto a surface of an adherend.
(2): A step of drying the applied primer composition.
(3): A step of modifying the surface of the adherend onto which the primer composition is applied by irradiating the dried primer composition with an active energy ray.
(4): A step of applying a curable resin composition onto the modified surface of the adherend.
(5): A step of forming a cured product of the curable resin composition onto the surface of the adherend by curing the applied curable resin composition.

Note that it is desirable that steps (1) to (3) in the above method for modifying a surface of an adherend or steps (1) to (5) in the above bonding method are conducted in this order.

Since the primer composition of the present invention is excellent in the duration of the effect between (2) and (3), it is possible to conduct these steps with a certain interval between the steps. For example, it is preferable that the effect be maintained even when the interval from (2) to (3) is 30 minutes or more, 40 minutes or more, 50 minutes or more, or 60 minutes or more. The "method for bonding an adherend" mentioned here includes not only simply bonding (coating) a curable resin composition (or a cured product thereof) onto a surface of an adherend, but also bonding two adherends using a curable resin composition. In the case of bonding two adherends using a curable resin composition, the adherends may be attached to each other before step (4), or may be attached to each other after step (4). The case of attaching the above adherend to another adherend before step (4) may be exemplified by (4a): a case in which two adherends are attached to each other, then steps (1) to (3) are conducted to apply the primer composition across both end portions of the two adherends at the attached end portions, and thereafter, step (4) of applying a curable resin composition to the end portions is conducted, or (4b): a case in which steps (1) to (3) are conducted in advance to apply the primer composition to surfaces of two adherends to come into contact, thereafter, the two adherends are fitted to each other, and step (4) to apply a curable resin composition to the portions at which the adherends are fitted or around the portions is conducted. In addition, the case of attaching the above adherend to another adherend after step (4) may be exemplified by (4c): a curable resin composition is applied onto the modified surface of the adherend in steps (1) to (3) ((step (4)), and further a step of applying another adherend (which may be or may not be modified with the primer composition) onto the applied curable resin composition, and subsequently, step (5) is conducted.

<Applying Method>

As the method for applying the primer composition of the present invention onto a surface of an adherend in step (1), an approach similar to a publicly-known method for applying an adhesive or a sealant is used. For example, methods such as dispensing, spray, inkjet, screen printing, gravure printing, dipping, spin-coating, and brushing using an automatic applicator can be used. Note that it is preferable that the primer composition of the present invention be a liquid at 25° C. from the viewpoint of applicability. In the case where the adherend has a sheet shape, the primer composition may be applied onto one or both of the surfaces of the adherend. In the case where the adherend has a three-dimensional shape, the primer composition may be applied some or all of the surfaces of the adherend.

<Step for Drying Primer Composition>

It is preferable to provide a drying step after the primer composition of the present invention is applied in step (2). The environmental temperature of the drying step is preferably 100° C. or less, more preferably 50° C. or less, and the primer composition that can be dried at ordinary temperature is most preferable. The drying time is preferably 0.1 seconds to 3 hours, more preferably 1 second to 2 hours, and most preferably 5 seconds to 1 hour from the viewpoint of the wetting and spreading properties to an adherend and workability.

<Conditions for Irradiation with Active Energy Ray>

In step (3), the primer composition of the present invention is modified by being irradiated with an active energy ray or the like after being dried. In the case where the surface modification method uses an active energy ray, the light source of the active energy ray such as an ultraviolet ray or visible light beam is not particularly limited, and for example, a low-pressure mercury lamp, a medium-pressure mercury lamp, a high-pressure mercury lamp, an ultra high-pressure mercury lamp, a black-light lamp, a microwave-excited mercury lamp, a metal-halide lamp, a sodium-vapor lamp, a halogen lamp, a xenon arc lamp, a LED, a fluorescent lamp, sunlight, an electron beam irradiation device, and the like can be used. The amount of the active energy ray for irradiation is preferably 10 kJ/m$^2$ or more, and more preferably 15 kJ/m$^2$ or more. The upper limit is not particularly limited, but is preferably 50 kJ/m$^2$ or less in consideration of the effect to members.

<Method for Applying Curable Resin Composition>

As the method for applying a curable resin composition onto the modified surface of the adherend in step (4) after the surface of the adherend is modified using the primer composition of the present invention, a publicly-known method is used. For example, methods such as dispensing, spray, inkjet, screen printing, gravure printing, dipping, and spin-coating using an automatic applicator can be used. Note that it is preferable that the curable resin composition of the present invention be a liquid at 25° C. from the viewpoint of applicability.

<Method for Curing Curable Resin Composition>

As the method for curing the curable resin composition applied onto the surface of the adherend in step (5), any desired conditions can be set depending on the form of cure of the curable resin composition. For example, in the case of a heat-curable resin composition, the heat-curable resin composition is preferably cured at 50° C. to 300° C., and further preferably cured at 70° C. to 200° C. The curing time in the case of the heat curing is preferably 0.1 to 200 minutes, and further preferably 1 to 100 minutes. In the case of an active energy ray-curable resin composition, the light source of the active energy ray such as an ultraviolet ray or visible light beam is not particularly limited, and a low-pressure mercury lamp, a medium-pressure mercury lamp, a high-pressure mercury lamp, an ultra high-pressure mercury lamp, a black-light lamp, a microwave-excited mercury lamp, a metal-halide lamp, a sodium-vapor lamp, a halogen lamp, a xenon arc lamp, an LED, a fluorescent lamp, a sunlight, an electron beam irradiation device, and the like can be used. The amount of the active energy ray for irradiation is preferably 5 to 50 kJ/m$^2$, and further preferably 7 to 40 kJ/m$^2$. In the case of a moisture-curable resin composition, the moisture-curable resin composition is preferably cured at 10 to 50° C., and the humidity is preferably 30 to 80%. The curing time in the case of the moisture curing is preferably 1 day to 2 weeks, and more preferably 3 days to 1 week. A cured product of the curable resin composition is formed on the surface of the adherend, which has been modified with the primer composition, by the above curing method.

<Surface-Modified Adherend and Stacked Body>

As a result of step (3), a surface-modified adherend of [the adherend]-[the primer composition (the cured product of the primer composition irradiated with the active energy ray after drying)] can be obtained, and as a result of step (5), a stacked body of [the adherend]-[the primer composition (the cured product of the primer composition irradiated with the active energy ray after drying)]-[the cured product of the curable resin composition] can be obtained.

The surface-modified adherend is composed of the adherend and a primer coating (the cured product of the primer composition) obtained on the surface of the adherend by drying the primer composition and irradiating the dried primer composition with the active energy ray. Without being bound by any theory, it is considered that the surface-modified adherend is in a state where the components of the primer composition other than the solvent, particularly the component (A) has been exposed to the active energy ray, which has caused hydrogen to be abstracted from the surface of the adherend made of a polyolefin or the like, and radicals have been generated to activate the surface. Note that it is impractical to analyze the physical and chemical states of an adherend having a modified surface, and it is more practical to express and specify the state of the surface by the method for modifying a surface like in steps (1) to (3).

A stacked body obtained by further applying and curing the curable resin composition on the surface of the surface-modified adherend has a structure in which the cured product of the curable resin composition is bonded onto the surface of the surface-modified adherend. The presence of the primer coating obtained by drying and irradiating the primer composition with the active energy ray makes it possible to stack the cured product of the curable resin composition even on an adherend that is a hard-to-bond material with sufficient adhesive force and sticking force with the cured product of the curable resin composition.

<Usage and Fields of Use>

Specific usages of the primer composition of the present invention and specific fields of use of the bonding method include the usages of bonding, sealing, cast molding, coating, and the like of switch parts, head lamps, components in engines, electric components, drive engines, brake oil tanks, body panels such as front hoods, fenders, and doors, windows, vehicle-body frames, and/or the like for automobiles as well as the field of automobiles and transporters to which these pertain; the usages of bonding, sealing, cast molding, coating, and the like of flat panel displays (liquid crystal displays, organic EL displays, light-emitting diode display devices, and field-emission displays), video discs, CDs, DVDs, MDs, pick-up lenses, hard disks, and the like as well as the field of electronic materials to which these pertain; the usage of bonding, sealing, coating, and the like of lithium batteries, lithium-ion batteries, manganese batteries, alkaline batteries, fuel cells, silicon solar cell, dye-sensitized cells, organic solar cells, and the like as well as the field of batteries to which these pertain; the usage of bonding, sealing, coating, and the like of the peripheries of optical switches, optical fiber materials in the peripheries of optical connectors, optical passive components, optical circuit components, the peripheries of opto-electronic integrated circuits as well as the field of optical components to which these pertain; the usage of bonding, sealing, coating, and the like of camera modules, lens materials, finder prisms, finder prisms, finder covers, light-reception sensor units, imaging lenses, projection lenses of projection televisions, and the like as well as the fields of optical devices to which these pertain; the usage of bonding, sealing, coating, and the like of syringe needles and needle hubs, tubes and connectors, fastening portions of cocks, pipes, and the like as well as the field of medicines to which these pertain; the usage of bonding, lining, sealing, coating, and the like of gas pipes, water pipes, and the like as well as the field of infrastructures to which these pertain, and the like.

As resins used in the field of automobiles and transporters, for example, polypropylene, polyethylene, polyurethane, ABS, phenolic resins, CFRP (carbon fiber-reinforced plastic), GFRP (glass fiber-reinforced plastic), 6,6-nylon, PPS, PBT, and the like are used. The present invention targets such members as adherends, and surface modification can be conducted using the primer composition for the purpose of improving the adhesiveness to the surfaces of these adherends in advance.

EXAMPLES

Next, the present invention will be described in further detail giving Examples. However, the present invention is not limited to only these Examples.

Examples 1 to 8, Comparative Examples 1 to 5

The following components were prepared in order to prepare compositions.
Component (A)
 (A): Benzophenone, having a molecular weight of 182.2
Component (B)
 (B-1): 4-Methacryloyloxybenzophenone, having a molecular weight of 266.3
 (B-2): 2,2,4,4-Tetramethylbenzophenone, having a molecular weight of 238.3
 (B-3): 3,3,4,4-Benzophenonetetracarboxylic dianhydride, having a molecular weight of 322.2
 (B-4): 4,4-Dimethylbenzophenone, having a molecular weight of 210.3
 (B-5): 4-Dimethylaminobenzophenone, having a molecular weight of 225.3
 (B-6): Xanthone, having a molecular weight of 196.2
 (B-7): 2,4-Dihydroxybenzophenone, having a molecular weight of 214.2 Components to be Compared with components (B)
 (B'-1): o-Acetoacetanisidide, having a molecular weight of 207.2
 (B'-2): 4,4-Dimethylbiphenyl, having a molecular weight of 182.3
Component (C)
 (C-1): Acetone, having a vapor pressure (25° C.) of 231.06 mmHg
 (C-2): n-Hexane, having a vapor pressure (25° C.) of 150 mmHg The component (C) was weighed in an agitation container, and the component (A) and the component (B) were added thereto, followed by agitation for 10 minutes using a mixer. Detailed preparation amounts were in accordance with Table 1 and Table 2, and all numerical values are expressed in parts by mass. All the tests were conducted at ordinary temperature (25° C.).

[Shear Adhesive Strength Test]

In the present Examples, the shear adhesive strength test was conducted by bonding an adherend and applying a tensile load in a thickness direction of the adherend which is perpendicular to the bonded surface to measure a tensile shear adhesive strength based on the tensile shear adhesive strength test of JIS K 6850 1999.

[Shear Adhesive Strength/Condition 1]

As adherends, two test pieces (made of polypropylene, and having a width of 25 mm×a thickness of 1.5 mm×a length of 100 mm) were prepared, and each of the primer compositions of Examples 1 to 8 and Comparative Examples 1 to 5 was applied onto the surface of one side of each test piece using waste cloth, and was left to stand at ordinary temperature for 30 seconds to dry the solvent (C). The surface on which the primer composition was applied was irradiated with an ultraviolet ray (30 kJ/m$^2$) using a high-pressure mercury lamp to modify the surface.

A curable resin composition (a mixture of bisphenol A epoxy resin:triethylenetetramine=100:13) was applied onto the modified surface of one of the test pieces in a range of a width of 25 mm×a length of 10 mm, and the modified surface of the other test piece was attached thereto, followed by curing at 100° C. for 1 hour in a hot-air drying furnace. The test pieces after the curing were cooled down to ordinary temperature, and measurement was conducted at a speed of 50 mm/min using a tensile testing machine based on the above shear adhesive strength test.

Acceptability Criterion of Condition 1: 4 MPa or More

[Shear Adhesive Strength/Condition 2]

As adherends, two test pieces (made of polypropylene, and having a width of 25 mm×a thickness of 1.5 mm×a length of 100 mm) were prepared, and each of the primer compositions of Examples 1 to 8 and Comparative Examples 1 to 5 was applied onto the surface of one side of each test piece using waste cloth, was left to stand at ordinary temperature for 30 seconds to dry the solvent (C), and thereafter was left to stand at 25° C. for 60 minutes. The surface on which the primer composition was applied was irradiated with an ultraviolet ray (30 kJ/m$^2$) using a high-pressure mercury lamp to modify the surface.

A curable resin composition (a mixture of bisphenol A epoxy resin:triethylenetetramine=100:13) was applied onto the modified surface of one of the test pieces in a range of a width of 25 mm×a length of 10 mm, and the modified surface of the other test piece was attached thereto, followed by curing at 100° C. for 1 hour in the hot-air drying furnace. The test pieces after the curing were cooled down to ordinary temperature, and measurement was conducted at a speed of 50 mm/min using the tensile testing machine based on the above shear adhesive strength test.

Acceptability Criterion of Condition 2: 4 MPa or More
Acceptability Criteria Based on Conditions 1 and 2: [the shear adhesive strength under condition 2]-[the shear adhesive strength under condition 1]=less than 1.0 MPa Note that the shear adhesive strength in the case where test pieces were bonded without using the primer composition of the present invention was 0.5 MPa. The shear adhesive strength in this case was measured in the same manner as in the above condition 1 except that the primer composition was not used. Specifically, a curable resin composition (a mixture of bisphenol A epoxy resin:triethylenetetramine=100:13) was applied onto a surface of one of the test pieces (made of polypropylene, and having a width of 25 mm×a thickness of 1.5 mm×a length of 100 mm) in a range of a width of 25 mm×a length of 10 mm, and the other test piece was attached thereto, followed by curing at 100° C. for 1 hour in the hot-air drying furnace. The test pieces after the curing were cooled down to ordinary temperature, and measurement was conducted at a speed of 50 mm/min using the tensile testing machine based on the above shear adhesive strength test (hereinafter referred to as condition 3).

TABLE 1

|   |   | Example 1 | Example 2 | Example 3 | Example 4 | Example 5 | Example 6 | Example 7 | Example 8 |
|---|---|---|---|---|---|---|---|---|---|
| A | Benzophenone | 1 | 1 | 1 | 1 | 1 | 1 | 1 | 1 |
| B-1 | 4-Methacryloyloxybenzophenone | 0.02 |  |  |  |  |  |  | 0.1 |
| B-2 | 2,2,4,4-Tetramethylbenzophenone |  | 0.02 |  |  |  |  |  |  |
| B-3 | 3,3,4,4-Benzophenonetetracarboxylic dianhydride |  |  | 0.02 |  |  |  |  |  |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
| B-4 | 4,4-Dimethylbenzophenone | | | | | 0.02 | | | | |
| B-5 | 4-Dimethylaminobenzophenone | | | | | | 0.02 | | | |
| B-6 | Xanthone | | | | | | | 0.02 | | |
| B-7 | 2,4-Dihydroxybenzophenone | | | | | | | | 0.02 | |
| B'-1 | o-Acetoacetanisidide | | | | | | | | | |
| B'-2 | 4,4-Dimethylbiphenyl | | | | | | | | | |
| C-1 | Acetone | | 20 | | | | | | 20 | 20 |
| C-2 | n-Hexane | | | 20 | 20 | 20 | 20 | 20 | | |
| Shear adhesive strength (PP/PP) MPa | | Condition 1 | 6.5 Passed | 6.3 Passed | 6.4 Passed | 5.8 Passed | 6.5 Passed | 5.4 Passed | 6.0 Passed | 5.5 Passed |
| | | Condition 2 | 6.4 Passed | 6.3 Passed | 6.2 Passed | 6.3 Passed | 6.3 Passed | 5.5 Passed | 5.5 Passed | 6.0 Passed |

TABLE 2

|  |  | Comparative Example 1 | Comparative Example 2 | Comparative Example 3 | Comparative Example 4 | Comparative Example 5 |
|---|---|---|---|---|---|---|
| A | Benzophenone | 1 | | 1 | 1 | 5 |
| B-1 | 4-Methacryloyloxybenzophenone | | | | | |
| B-2 | 2,2,4,4-Tetramethylbenzophenone | | | | | |
| B-3 | 3,3,4,4-Benzophenonetetracarboxylic dianhydride | | | | | |
| B-4 | 4,4-Dimethylbenzophenone | | | | | |
| B-5 | 4-Dimethylaminobenzophenone | | | | | |
| B-6 | Xanthone | | 0.02 | | | |
| B-7 | 2,4-Dihydroxybenzophenone | | | | | |
| B'-1 | o-Acetoacetanisidide | | | 0.02 | | |
| B'-2 | 4,4-Dimethylbiphenyl | | | | 0.02 | |
| C-1 | Acetone | 20 | 20 | 20 | | |
| C-2 | n-Hexane | | | | 20 | 20 |
| Shear adhesive strength (PP/PP) MPa | Condition 1 | 6.4 Passed | 1.2 Failed | 3.9 Failed | 5.7 Passed | 6.4 Passed |
| | Condition 2 | 3.5 Failed | 1.1 Failed | 1.9 Failed | 2.5 Failed | 3.5 Failed |

It can be understood that there was no decrease in adhesive force even when time elapsed after the application of the primer composition by using the component (B) as shown in Table 1. In the case where the component (B) was not used as shown in Comparative Example 1 of Table 2, a decrease in adhesive force was observed after 60 minutes. In addition, as shown in Comparative Example 2, when the component (A) was excluded, a result of low adhesive force under condition 1 was obtained. Moreover, as shown in Comparative Examples 3 and 4, no expression of the effect was observed even using compounds that did not fall under the component (B). Comparative Example 5 was obtained by increasing the amount of the component (A) and excluding the component (B), but the effect was not obtained. In addition, since the shear adhesive strength under condition 3 where the primer composition was not used was 0.5 MPa, it can be understood that the adhesive force was significantly improved by the primer composition of the present invention.

<Use of Primer Composition for Active Energy Ray-Curable Resin Composition>

As adherends, two test pieces (made of polypropylene, and having a width of 25 mm×a thickness of 1.5 mm×a length of 100 mm) were prepared, the primer composition of Example 1 was applied onto one side of each test piece using waste cloth, and was left to stand at ordinary temperature for 60 minutes to dry the solvent (C). An active energy ray-curable resin composition containing a compound having two or more (meth)acryloyl groups (ThreeBond 3094 manufactured by ThreeBond Co., Ltd.) was applied onto the modified surface of one of the test pieces in a range of a width of 25 mm×a length of 10 mm, and the other test piece (made of polyethylene, and having a width of 25 mm×a thickness of 1.5 mm×a length of 100 mm) was attached thereto, which was irradiated with an ultraviolet ray of 30 kJ/m$^2$ using the high-pressure mercury lamp to be cured. When the test pieces after the curing were subjected to measurement at a speed of 50 mm/min using the tensile testing machine based on the above shear adhesive strength test, the shear adhesive strength was 6.4 MPa. Since the shear adhesive strength under condition 3 where the primer composition was not used was 0.9 MPa, it can be understood that the adhesive force can be significantly improved by using the primer composition of the present invention.

<Use of Primer Composition for Moisture-curable Resin Composition>

As adherends, two test pieces (made of polypropylene, and having a width of 25 mm×a thickness of 1.5 mm×a length of 100 mm) were prepared, the primer composition of Example 1 was applied onto one side of each test piece using waste cloth, and was left to stand at ordinary temperature for 60 minutes to dry the solvent (C). A moisture-curable resin composition containing a compound having two or more hydrolyzable silyl groups (ThreeBond 1217G manufactured by ThreeBond Co., Ltd.) was applied onto the modified surface of one of the test pieces in a range of a width of 25 mm×a length of 10 mm, and the other test piece (made of polyethylene, and having a width of 25 mm×a thickness of 1.5 mm×a length of 100 mm) was attached thereto, which was cured at 25° C.×55% RH×1 week. When the test pieces after the curing were subjected to measurement at a speed of 50 mm/min using the tensile testing machine based on the above shear adhesive strength test, the shear adhesive strength was 2.0 MPa. Since the shear adhesive strength under condition 3 where the primer composition was not used was 0.2 MPa, it can be understood that the adhesive force can be significantly improved by using the primer composition of the present invention.

INDUSTRIAL APPLICABILITY

Since the primer composition of the present invention can improve an adhesive force to a hard-to-bond material regardless of the type of form of cure of an adhesive and is excellent in the duration of the effect, the primer composition of the present invention is industrially very useful.

What is claimed is:

1. A primer composition comprising:
   a component (A): benzophenone;
   a component (B): the component (B) is selected from the group consisting of 4-methacryloyloxybenzophenone, 2,2,4,4-tetramethylbenzophenone, 3,3,4,4-benzophenonetetracarboxylic dihydride, 4,4-dimethylbenzophenone, 4-dimethylaminobenzophenone, xanthone, and 2,4-dihydroxybenzophenone; and
   a component (C): a solvent,
wherein a content of the component (B) is 1 to 12 parts by mass relative to 100 parts by mass of the component (A), and wherein the component (C) is acetone or n-hexane.

2. The primer composition according to claim 1, wherein the component (B) is 4-methacryloyloxybenzophenone.

3. The primer composition according to claim 1, wherein a content of the component (B) is 2 to 10 parts by mass relative to 100 parts by mass of the component (A).

4. The primer composition according to claim 1, that is used for bonding a hard-to-bond material.

5. A method for bonding an adherend, comprising the steps of:
   (1): applying the primer composition according to claim 1 onto a surface of an adherend;
   (2): drying the applied primer composition;
   (3): modifying the surface of the adherend onto which the primer composition is applied by irradiating the dried primer composition with an active energy ray;
   (4): applying a curable resin composition onto the modified surface of the adherend; and
   (5): forming a cured product of the curable resin composition on the surface of the adherend by curing the applied curable resin composition.

6. The bonding method according to claim 5, wherein the curable resin composition comprises a compound having any of a (meth)acryloyl group, an epoxy group, and a hydrolyzable silyl group.

7. The bonding method according to claim 5, wherein the adherend is of polypropylene or polyethylene.

8. A method for modifying a surface of an adherend, comprising the steps of;
   (1): applying the primer composition according to claim 1 onto a surface of an adherend;
   (2): drying the applied primer composition; and
   (3): modifying the surface of the adherend onto which the primer composition is applied by irradiating the dried primer composition with an active energy ray.

9. The primer composition according to claim 1, wherein the primer composition consists of the component (A), the component (B) and the component (C).

10. The primer composition according to claim 2, wherein a content of the component (B) is 2 to 10 parts by mass relative to 100 parts by mass of the component (A).

11. The primer composition according to claim 2, wherein the total content of the component (A) and the component (B) is 1 to 20 parts by mass relative to 100 parts by mass of the component (C).

12. The primer composition according to claim 1, wherein a shear adhesive strength is maintained at at least 4 MPa after 60 minutes at 25° C. following primer application.

13. The primer composition according to claim 4, wherein the hard-to-bond material is selected from polyethylene, polypropylene, polyacetal, polyethylene terephthalate, syndiotactic polystyrene, or polyphenylene sulfide.

* * * * *